United States Patent [19]

Mauro

[11] Patent Number: 6,016,716
[45] Date of Patent: Jan. 25, 2000

[54] ANTI-BACKLASH MECHANISM FOR A ROTARY STAGE

[76] Inventor: George Mauro, 26 Keewaydin Dr. Suite B, Salem, N.H. 03079

[21] Appl. No.: 08/983,403
[22] PCT Filed: Jun. 9, 1997
[86] PCT No.: PCT/US97/09915
    § 371 Date: Jan. 20, 1998
    § 102(e) Date: Jan. 20, 1998
[87] PCT Pub. No.: WO98/00655
    PCT Pub. Date: Jan. 8, 1998

Related U.S. Application Data

[60] Provisional application No. 60/020,420, Jun. 18, 1996.
[51] Int. Cl.[7] .............................. F16H 55/18; F16H 1/16; A41F 1/00
[52] U.S. Cl. .................................. 74/409; 74/425; 24/456
[58] Field of Search ........................... 74/396, 425, 409; 24/456

[56] References Cited

U.S. PATENT DOCUMENTS 1,327,129   1/1920   Wolff ......................................... 74/396
4,040,307   8/1977   Koster .
4,827,790   5/1989   Bisiach .
5,605,071   2/1997   Buchanan, Jr. ........................... 74/425

FOREIGN PATENT DOCUMENTS 5-65944    3/1993   Japan .
6-58375    3/1994   Japan .
1521957   11/1989   Russian Federation .

*Primary Examiner*—Tamara L. Graysay
*Assistant Examiner*—Colby Hansen
*Attorney, Agent, or Firm*—Davis and Bujold

[57] ABSTRACT

In a rotary stage, driven by a conventional multi-tooth rotary worm wheel, interacting with a rotationally powered worm gear, a housing functions as a base mount for the worm wheel. The housing has a bore disposed within a cylinder positioned perpendicular to the worm wheel axis. A rotational power source, such as a motor, is mounted on an elongate support which is mounted along an elongate edge to a base of the housing. The support extends parallel to the motor axis and, along with a biasing spring, biases the motor and worm gear toward the worm wheel. Adjustable screw are provided to vary the pressure load of the bias of the worm gear against the worm wheel, or providing a selectable anti-backlash pressure between the worm wheel and the worm gear.

8 Claims, 2 Drawing Sheets

ANTI-BACKLASH MECHANISM FOR A ROTARY STAGE

This application claims priority under 35 U.S.C. Section 120 from provisional application 60/020,420 filed Jun. 18, 1996.

FIELD OF THE INVENTION

This invention relates to an anti-backlash gear mechanism. More specifically, this invention relates to a worm wheel, interacting with a worm gear resiliently biased against the worm wheel providing a selectable backlash pressure.

BACKGROUND OF THE INVENTION

In the art of gears there exists many types of gear arrangements. Gear teeth can vary in form from spur and helical, to worm, bevel, and hypoid shapes. Further, the shafts around which the gears rotate can vary in relative arrangement from parallel, to skew or intersecting.

Generally, gears are made from a strong and durable material able to withstand the repeated sliding contact and pressure loads between gear teeth relative to a load placed on the gears. In addition, gears are most commonly mounted to a structure or housing, such that each gear may only rotate about one axis. Typically, gears in contact are also mounted such that their centers remain a fixed distance from each other. As a result, gears are constructed such that the teeth, when they mesh with the teeth of mating gears, have a predetermined amount of play, or backlash. This backlash allows the teeth of mating gears to mesh together and part as the gears rotate.

Backlash, in its simplest terms, is the difference in the width of a gear tooth space from the width of a mating gear tooth, measured at a pitch circle or pitch plane. The pitch circle or pitch plane is an imaginary circle or plane that rolls or moves without slippage with a pitch circle or pitch plane of a mating gear.

In some applications of gears, it is of great importance to rotate, or move, a particular object such as a platform, with a combination of gears, such that a resulting location of the platform is precise relative to a predetermined target location. By precise, what is meant is within an acceptable margin of error for an application. A shortcoming of a typical combination of gears is that the built-in backlash, required to allow the gear teeth of mating gears to engage and disengage, results in the platform being moved non-precisely such that the resulting location is not the target location within an acceptable margin of error.

Attempts have been made by means of various methods to address this seemingly inherent characteristic of backlash in gears. An attempted solution to cure backlash in worm gears has been generally to use a joint at one end of a worm gear, and a spring at the other end pulling the worm gear toward a mating worm wheel. A shortcoming related to this type of arrangement involves the lack of control over axial movement of the worm gear. An additional shortcoming is a lack of control over torsional forces on the worm gear resulting from the pressure of the spring, which impairs the accuracy and/or repeatability of the rotary positioning of the platform or attached movable object.

SUMMARY OF THE INVENTION

Wherefore, it is an object of the present invention to overcome the aforementioned problems and drawbacks associated with the prior art designs.

Another object of the invention is to pre-load a worm gear onto a worm wheel without suffering the consequences of other, undesirable flexibilities which would impair the accuracy and/or repeatability of the rotary positioning system.

Yet another object of this invention is to create a repeatable, rotational positioning stage, with virtually no backlash, along with very smooth motion, and simple and reliable assembly procedures.

The present invention relates to an anti-backlash rotating positioning mechanism. The mechanism has a housing with a base portion that acts as a support structure.

The base portion includes a resiliently biased support. The elongate support is made fast with the support structure along an elongate edge. On an opposing elongate edge are mounted two bearing means supporting a driving gear having an axis of rotation parallel to the elongate edges of the support. The driving gear mates with the driven gear.

An adjustment mechanism is attached to the support structure. The mechanism is used to adjust the resilient bias of the elongate support and attached driving gear against the driven gear. Varying bias levels create varying pre-load conditions between the driving gear and driven gear, thus eliminating backlash.

When assembled, the support is biased by some means, and provides a load or pressure between the attached driving gear, and the mating driven gear. To rotationally position an object such as a platform, a rotary power source is activated and the driving gear rotates. The rotating driving gear causes the mating driven gear to rotate. An object such as a platform is attached to the driven gear such that it rotates precisely, without unacceptable backlash error, to a predetermined target position.

More specifically, the invention provides an anti-backlash mechanism, comprising: a support structure; a driven gear supported for rotation by the support structure; a driving gear, having an axis of rotation, engaging the driven gear; a resiliently biased support for the driving gear fast with the support structure along an edge, the edge of the support being parallel to the axis of rotation of the driving gear; and an adjustment mechanism to adjust the resilient bias of the support and attached driving gear against the driven gear, to eliminate backlash therebetween.

The invention further includes the anti-backlash mechanism as previously stated, wherein the driven gear is a worm wheel and the driving gear is a worm gear supported by bearing means fast with the support.

BRIEF DESCRIPTION OF THE DRAWINGS

The invention will now be described, by way of example, with reference to the accompanying diagrammatic drawings in which.

DESCRIPTION OF THE PREFERRED EMBODIMENTS

Figure 1:
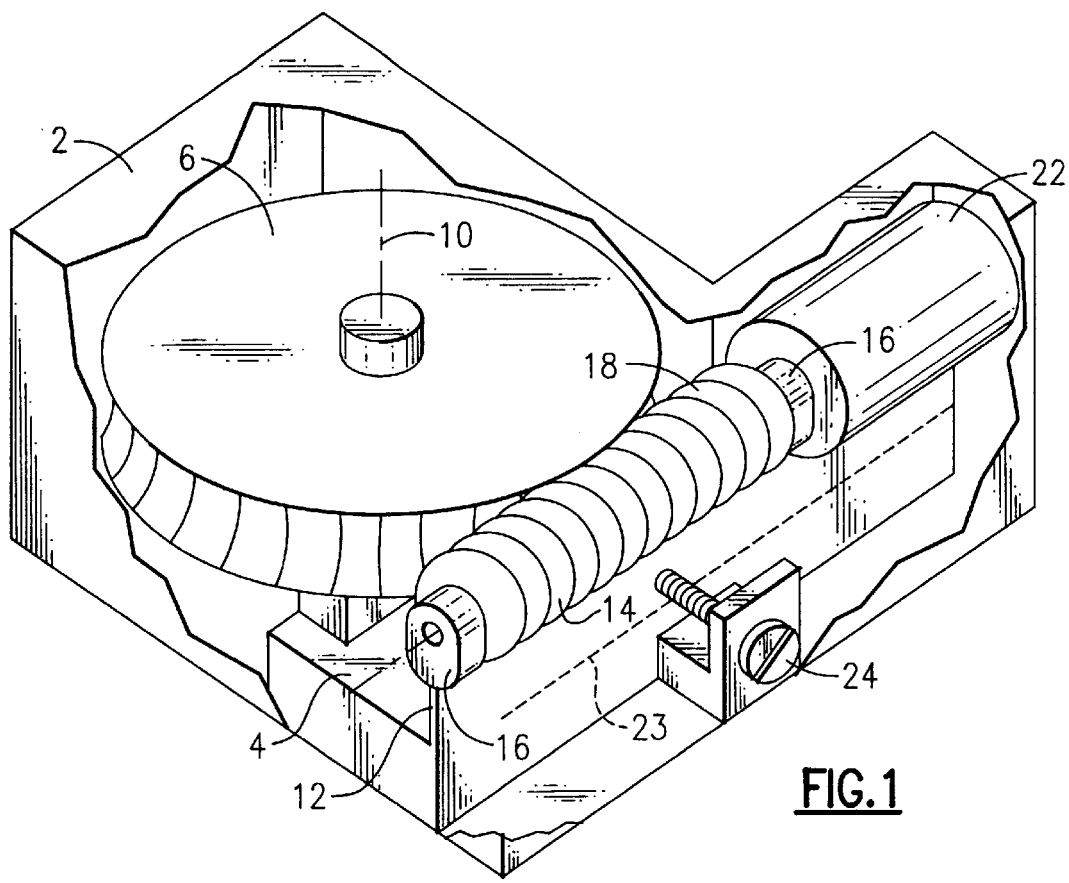
FIG. 1 is a perspective view of a mechanism located within a housing, with an upper part of the housing cut away.
Figure 2:
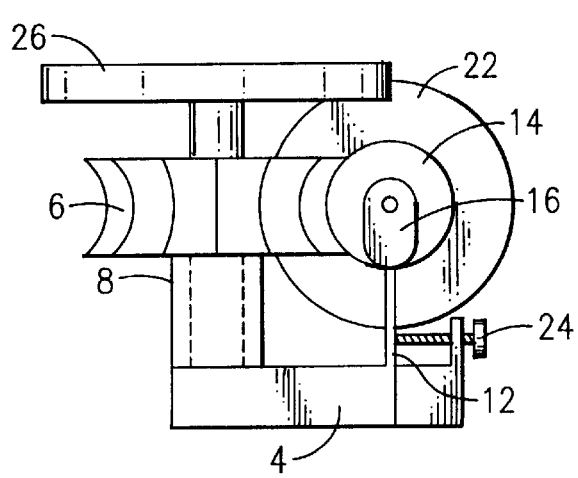
FIG. 2 is a fragmentary end view of the mechanism of FIG. 1, mounted on a base of the housing.

Turning first to FIGS. 1 and 2, a detailed description concerning the present invention will now be provided.

In a preferred embodiment of a rotary positioning system, a housing 2 is provided. Within the housing is a base 4.

A worm wheel 6 is rotatably mounted on the base 4 by a bearing 8 and with an axis of rotation 10.

A resilient elongate support 12 is fast with the base 4. The elongation of the elongate support 12 is perpendicular to the axis of rotation 10 of the worm wheel 6.

Along an elongate edge of the elongate support 12 a worm gear 14 is mounted by two bearings 16. The worm gear 14 is mounted parallel to the elongate support 12, thus has an axis of rotation 18 which is perpendicular to the axis of rotation 10 of the worm wheel 6.

Directly connected by a drive shaft (not shown) to the worm gear 14, is a motor 22. The motor 22, the worm gear 14, and the bearings 16 are mounted to the elongate support 12. The two bearings 16 are spaced apart by the length of the worm gear 14 and/or the length of the worm gear 14 and the motor 22.

The length of the elongate support 12 along the edge that is fast with the base 4 is greater than a distance between the edge fast with the base 4 and an opposite edge supporting the bearing means 16, worm gear 14 and motor 22.

As previously mentioned, the resilient elongate support 12 is fast with the base 4 such that when the support 12 is biased, the worm gear 14, and the motor 22 rotate about an elongate flex region 23 of the elongate support 12, parallel to the axis of rotation, and the worm gear 14 is positioned such that it mates with the worm wheel 6.

In this embodiment, the elongate support 12 is biased toward the worm wheel 6 by an adjustment screw 24. The adjustment screw 24 is tightened, or loosened, resulting in increased or decreased pressure between the worm wheel 6 and the worm gear 14 at their mating point, resulting in a pre-load condition, thereby substantially eliminating backlash.

A rotating platform 26 is fixedly attached to the worm wheel 6 such that when the worm wheel 6 rotates, the platform 26 rotates as well.

When the motor 22 is activated, the worm gear 14 is rotated causing the worm wheel 6 to rotate which in turn, causes the attached rotating platform 26 to rotate to a predetermined location. The elongate support 12 is biased by the adjustment screw 24 causing the worm gear 14 to press against the worm wheel 6. As the worm gear 14 rotates about its axis of rotation 18, the biased elongate support 12 minimizes the effect of any resulting forces acting on the worm gear 14 that are less than the biasing force and are trying to push the gear out of position. In effect, backlash is prevented from occurring at any perceptible level. The elongate support 12 substantially prevents any unwanted position changes of the worm gear 14, due to any resulting torsional or axial forces, causing any backlash. This, in turn, allows rotation of the rotating platform 26 precisely to a predetermined location, within an acceptable margin of error for the application.

Figure 3:
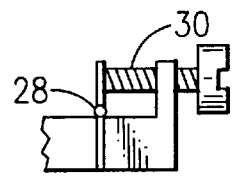
FIG. 3 is a side view of a means for biasing in contact with a hinged support.

FIG. 3 illustrates another embodiment of the invention. The elongate support 12, which is substantially rigid, is pivotally attached to the housing base 4 with an elongate hinge 28, parallel to the axis of rotation 18 of the worm gear 14. The elongate support 12 continues through the housing 2 for at least the length of the worm gear 14, and motor 22, substantially preventing torsional forces from rotating the worm gear 14 about a vertical axis, perpendicular to the axis of rotation 18. There is an adjustment screw with a spring 30 which biases the elongate support 12 toward the worm wheel 6.

Figure 4:
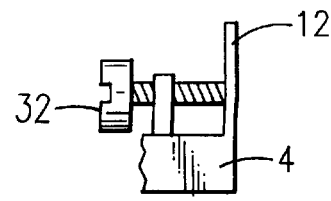
FIG. 4 is a side view of an adjustment screw in contact with a leaf spring which is biased toward a rotary worm gear.

Yet another embodiment of the invention is illustrated in FIG. 4. An adjustment screw 32 is placed in the housing 2 set against the elongate support 12 which is a leaf spring, such that the axis of the screw(s) 32 is perpendicular to the plane of the surface of the elongate support 12. Here, the elongate support 12 is biased toward the rotary worm gear, and the adjustment screw(s) 32 are tightened or loosened to adjust the bias. This results in a predetermined pressure being placed on the worm wheel 6 by the worm gear 14. This causes a predetermined pre-loaded condition between the mating gears to essentially elminate backlash.

Figure 5:
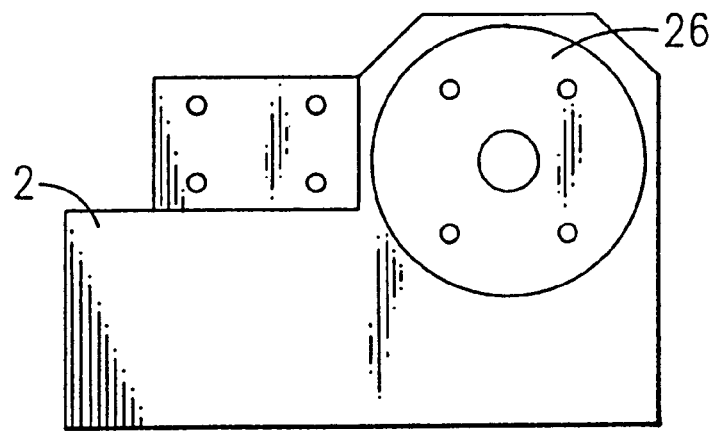
FIG. 5 is a plan view of a housing and a rotating platform.
Figure 6:
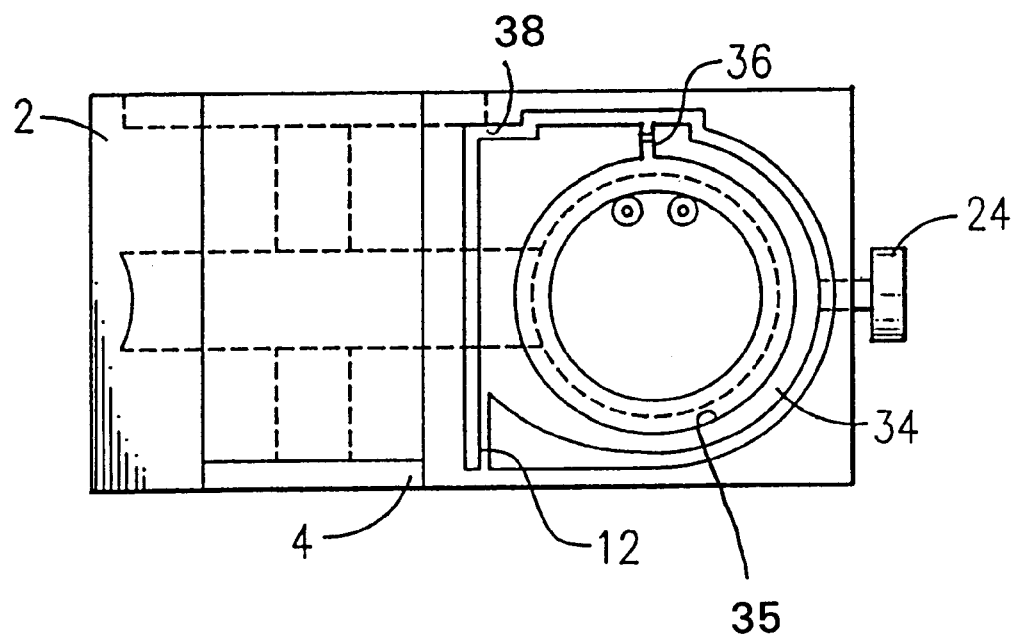
FIG. 6 is a rear view of a housing, a bore, a leaf spring, and an adjustment screw as shown in FIG. 5.

FIGS. 5 and 6 illustrate one embodiment of a housing 2 which encloses the mechanism. A plan view of a design of a rotating platform 26 is shown in FIG. 5. FIG. 6 shows a rear view of the housing 2. The end of the elongate support 12 is shown as it is fixed to the base 4. A cylinder 34 defining a bore 35 surrounds the location of the worm gear 14, and includes an enclosed self-contained clamp 36. This clamp 36 is mounted along an elongate edge of the elongate support 12. It holds a motor 22, and the bearing(s) 16 supporting the worm gear, in place. The elongate support 12, the cylinder 34 defining the bore 35 and the clamp 36 are formed from an elongate slot 38 which extends through the entire housing 2 and is machined by an EDM machine.

Wherefore, I claim:

1. An anti-backlash mechanism, comprising:

a support structure;

a driven gear supported for rotation by the support structure;

a driving gear, having an axis of rotation, engaging the driven gear;

a resiliently biased support for the driving gear fast with the support structure along an edge, the edge of the support being parallel to the axis of rotation of the driving gear;

an adjustment mechanism to adjust the resilient bias of the support and attached driving gear against the driven gear, to eliminate backlash therebetween, the driven gear is a worm wheel and the driving gear is a worm gear supported by bearing means fast with the support; and wherein the support is of an elongate shape where a length of the edge fixed to the support structure is greater than a distance between the edge fixed to the support structure, and an opposite edge supporting the bearing means and worm gear.

2. An anti-backlash mechanism, comprising:

a base and a resiliently biased support both formed from a support structure, and being a single piece;

a driven gear supported for rotation by the base along a first axis of rotation;

a driving gear supported for rotation by the resiliently biased support along a second axis of rotation, the driving gear engages the driven gear; and, an adjustment mechanism engaging on the support structure to adjust the resilient bias of the resiliently biased support and the supported driving gear against the driven gear to eliminate backlash therebetween.

3. The anti-backlash mechanism as set forth in claim 2 wherein said first and second axis of rotation are perpendicular to one another and biasing of the resiliently biased support causes a parallel displacement of the second axis of rotation with respect to said first axis.

4. The anti-backlash mechanism as set forth in claim 3 wherein said support structure is a housing having a bore extending the length of the housing, the bore defining from the base the resiliently biased support.

5. The anti-backlash mechanism as set forth in claim 4 wherein said resiliently biased support has a cylinder concentric with and extending the length of the bore, said cylinder substantially encompasses and rotatably supports the driving gear.

6. The anti-backlash mechanism as set forth in claim 4 wherein said bore of said housing is formed by an EDM machine.

7. An anti-backlash mechanism, comprising:

a housing having both a base defining a bore extending the length of the housing, and a resilient elongate support fast with and extending the length of the bore, the housing being a single complete element machined by an EDM machine;

a driven gear rotatably supported about a first axis of rotation within the housing;

a driving gear rotatably supported about a second axis of rotation within the bore, the second axis supportably aligned along a parallel edge of the resilient elongate support; and an adjustment mechanism for biasing the resilient elongate support, the adjustment mechanism calibrating a desired dynamic contact between the driving and driven gears by effectuating a parallel displacement of said second axis of rotation wherein backlash between the gears is eliminated.

8. The anti-backlash mechanism as set forth in claim 7 wherein said housing further includes a cylinder fast with the resilient elongate support and extending the length of the bore, the cylinder substantially encompassing and securing the driving gear.

* * * * *